May 30, 1961 B. McKIM 2,986,604

DIAL TELEPHONE OFFICE ARRANGED FOR REGISTER-SENDER CONTROL OF TWO-MOTION STEP-BY-STEP SWITCHES HAVING MULTILEVEL TRUNK GROUPS

Filed Sept. 6, 1957 5 Sheets-Sheet 1

INVENTOR
B. Mc KIM
BY A. F. Kane
ATTORNEY

May 30, 1961 B. McKIM 2,986,604

DIAL TELEPHONE OFFICE ARRANGED FOR REGISTER-SENDER CONTROL OF TWO-MOTION STEP-BY-STEP SWITCHES HAVING MULTILEVEL TRUNK GROUPS

Filed Sept. 6, 1957 5 Sheets-Sheet 2

INVENTOR
B. Mc KIM
BY
A. F. Kane
ATTORNEY

May 30, 1961 B. McKIM 2,986,604

DIAL TELEPHONE OFFICE ARRANGED FOR REGISTER-SENDER CONTROL OF TWO-MOTION STEP-BY-STEP SWITCHES HAVING MULTILEVEL TRUNK GROUPS

Filed Sept. 6, 1957 5 Sheets-Sheet 3

INVENTOR
B. Mc KIM
BY A. F. Kane
ATTORNEY

May 30, 1961 B. McKIM 2,986,604

DIAL TELEPHONE OFFICE ARRANGED FOR REGISTER-SENDER CONTROL OF TWO-MOTION STEP-BY-STEP SWITCHES HAVING MULTILEVEL TRUNK GROUPS

Filed Sept. 6, 1957 5 Sheets-Sheet 4

INVENTOR
B. Mc KIM
BY A. F. Kane
ATTORNEY

May 30, 1961 B. McKIM 2,986,604

DIAL TELEPHONE OFFICE ARRANGED FOR REGISTER-SENDER CONTROL OF TWO-MOTION STEP-BY-STEP SWITCHES HAVING MULTILEVEL TRUNK GROUPS

Filed Sept. 6, 1957 5 Sheets-Sheet 5

INVENTOR
B. Mc KIM
BY G. F. Kane
ATTORNEY

United States Patent Office 2,986,604

Patented May 30, 1961

2,986,604

DIAL TELEPHONE OFFICE ARRANGED FOR REGISTER-SENDER CONTROL OF TWO-MOTION STEP-BY-STEP SWITCHES HAVING MULTI-LEVEL TRUNK GROUPS

Burton McKim, Morristown, N.J., assignor to Bell Telephone Laboratories, Incorporated, New York, N.Y., a corporation of New York Filed Sept. 6, 1957, Ser. No. 682,523

9 Claims. (Cl. 179—18)

This invention is a telephone switching system and particularly one including switches of the dial pulse-controlled type and including common control means for directing the operation of the switches.

In systems comprising digital pulse-controlled switches of the two-motion step-by-step type, the switches may be directly controlled by dial pulses created by operation of the dial at a calling subscriber station or may be controlled by pulse transmitting means in common control equipment, which includes registers settable responsive to the dialing of a called subscriber's directory number by a calling subscriber. Since the terminal banks of two-motion step-by-step switches are divided into ten levels of terminals, the ten terminals of each level are connected either to a group or to a subgroup of trunks. When traffic requires more than ten trunks in a group it is usual to split the trunk group into subgroups of ten and connect the trunks of each subgroup to the same level of a corresponding subgroup of the switches of the selector stage in question. In such a case an increase in the total number of trunks is necessary to compensate for a reduction in the efficiency of the group.

Objects of this invention are to improve the efficiency of the trunking in telephone systems comprising two-motion switches of the dial pulse-controlled step-by-step type, in combination with common control means for directing the selective operation of these switches, and to overcome the limitations of the ten terminal per level access of these switches without any switch modification.

This invention is a telephone system in which two-motion step-by-step switches are directively controlled by common control means to select a level of terminals to which are connected a group or a subgroup of trunks in which selection of a trunk is required for use in completing a desired connection between calling and called stations, one or more of the trunk groups being large enough to require terminals in a plurality of levels.

A feature of the invention is a telephone system as described in the preceding paragraph which includes pulse sending means and digit control relays which control the transmission of pulses to operate a step-by-step selector switch to select a level of terminals to which are connected trunks in the particular group which is to be used to establish a desired telephone connection, these control relays being selectively operated under control of a route relay identified by the code digits dialed by the calling station to which the common control means is connected.

A further feature of the invention is a telephone system according to the preceding paragraph in which some of the outgoing trunk groups are connected to first stage selector banks and other groups are connected to the banks of a succeeding stage of selectors, there being a set of digit control relays for each of the maximum number of digital trains of pulses required for trunk group selection, the number of trains of pulses which are transmitted corresponding to the number of stages of selection required for selecting a trunk in the group required to complete any particular connection.

A further feature of the invention is a telephone system comprising common control means for directing the operation of two-motion step-by-step selector switches to select a level of terminals connected to trunks in a desired trunk group, this group including trunks connected to a plurality of levels of said switches, the control means including means for effecting the selection of the first level in which at least one trunk is idle or the selection of the last level in the group irrespective of whether there is or is not an idle trunk connected to this last level.

The invention and its features, including those above mentioned are embodied in the system shown in the drawings which form part of this specification; but the invention is not limited to the particular system or the specific srtuctures shown in these drawings.

Referring to the drawings, which consist of six figures:

Fig. 1 shows, schematically, a system comprising subscriber stations such as station A, line finders such as LF1, first selectors such as S1–1, second selectors such as S2–1, finder-selector trunk circuits such as T1, trunk finders such as TF1, outgoing trunk circuits such as T–01, T–201, T–210, T–211, T–221 and T–231, and group busy relays such as G21;

Fig. 5 shows the relative position in which Figs. 1 to 4 are placed to form an operative arrangement.

Figures 1, 5:
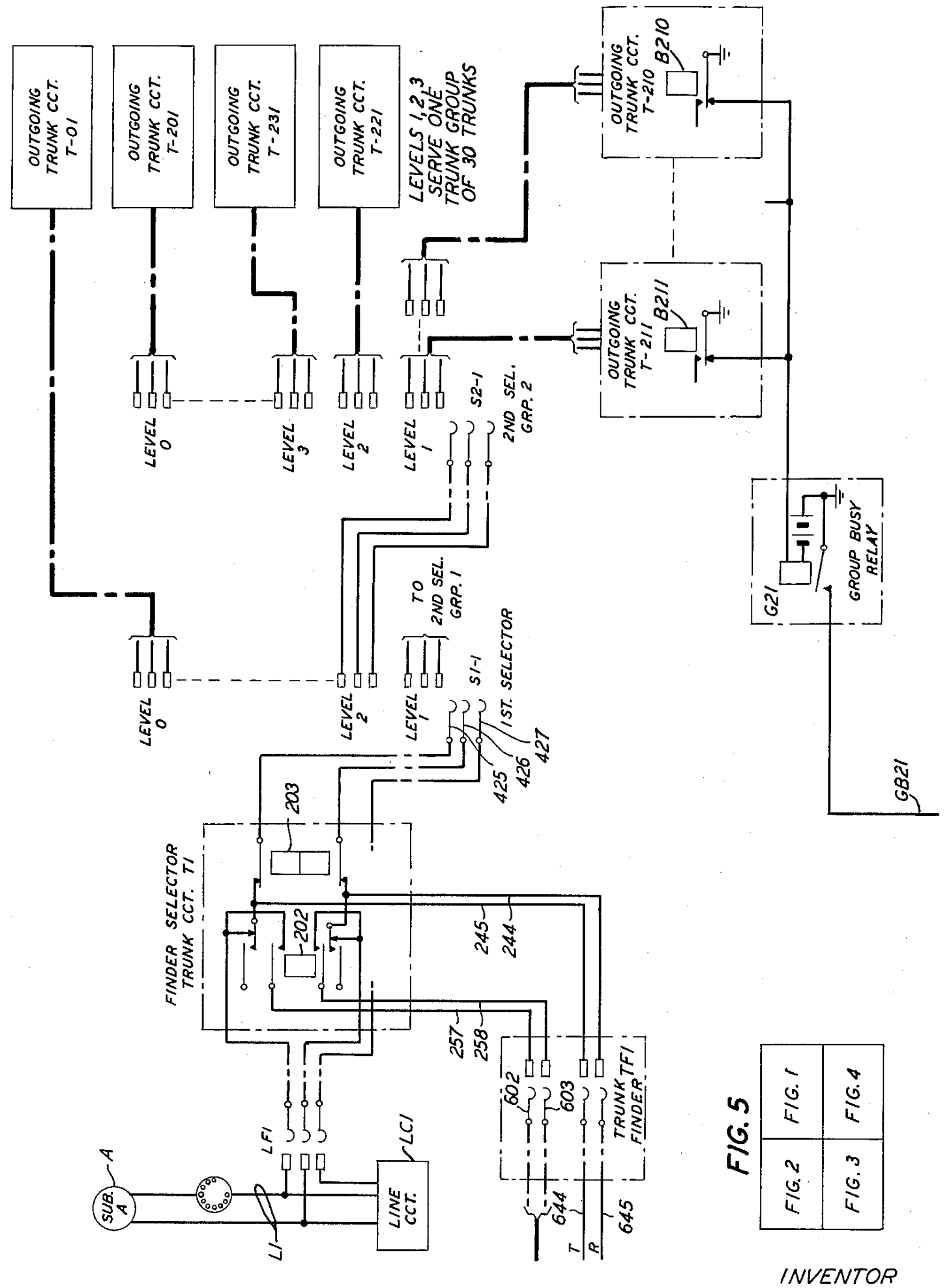

The system shown schematically in Figs. 1 to 4 inclusive, comprises lines connecting subscriber stations to central office circuit and switching equipment for connecting calling lines to outgoing trunks. The switching equipment is of the step-by-step two-motion type and comprises line finder switches, trunk finder switches, dial pulse-controlled first and second selectors, and groups of outging trunks connected to the various terminal bank levels of the selectors. Reference may be had to "Automatic Telephony" by Smith and Campbell, second edition, pages 52 to 65, for a description of the structure of such switches and their operation as selectors. Reference may be had to Patent 1,809,124 granted June 9, 1931 to H. Hovland for a description of the operation of such switches when used as line finders. Each of the switches shown in Fig. 1 is represented by a set of brushes and one or more sets of terminals, all of the associated control equipment being omitted.

In Fig. 1 the dial equipped subscriber station A is connected by line L1 to an individual line circuit LC1 and to terminals in the banks of line finder switches, one such line finder LF1 being shown. The line L1, in accordance with usual practice, is also connected to terminals in the banks of connector switches, none of which are shown. The line finder switches are used on calls initiated at calling stations such as station A; and the connectors (not shown) are used to establish connection with the stations when called. Each line finder is individually connected by a finder-selector trunk circuit to a first selector, one such trunk T1 being shown as connecting line finder LF1 to a first selector S1–1. The trunk circuit T1, which is represented by relays 202 and 203, is similar to the trunk circuit shown in Fig. 2 and described in the specification of Patent 2,355,908 granted to J. W. Dehn, August 15, 1944. Relays 202 and 203 correspond to those like designated relays in this Dehn patent, relay 202 being operated to connect the calling line to the dial pulse receiving relay in the register sender as described by Dehn. The first selectors give access to second selectors and to groups of trunks. The terminals of levels 1 and 2 of selector S1–1 are shown connected to second selectors in groups 1 and 2, respectively, and the terminals of level 0 are shown connected to a group of outgoing trunks, of which the trunk T–01 is the only one shown. The terminals in the banks of the second selectors give access to trunks in a plurality of outgoing trunk groups. The terminals in levels 1, 2 and 3 of second selector S2–1 are shown connected to a group of thirty trunks including trunks T–211, 2–210, T–221 and T–231 all outgoing to the same destination; and the terminals of level 0 are shown connected to another group consisting of ten trunks, of which only the trunk T–201 is shown. The terminals in the other levels may be connected to trunks in other groups, one or more of which may be multilevel groups.

Each outgoing trunk circuit includes relay means such as relays B211 and B210 associated with trunks T–211 and T–210, respectively, for connecting ground as a busy marking potential to the sleeve or test conductor during the time the trunk circuit is busy and for connecting ground potential to a common group busy relay as long as the trunk circuit is idle. The busy and idle indicating relay means is shown in Fig. 1 for each of the levels of outgoing trunk circuits T–211 to T–210 and the associated group busy relay associated with these ten trunks is provided to connect ground to group busy conductor GB21 whenever all of these ten trunks are busy. Each level of the selector banks, other than the level 0, in which the terminals are connected to outgoing trunks, is likewise provided with a group busy relay for connecting ground to a group busy conductor, to indicate that all trunks in the level are busy whenever such a condition exists. Reference may be had to Fig. 5 and the accompanying description in the aforementioned Patent 2,355,908, granted to J. W. Dehn, August 15, 1944, for disclosure of an outgoing trunk circuit which includes relay means comprising the relay designated 536 for connecting busy ground potential to the test conductor whenever the trunk is busy.

Figure 2:
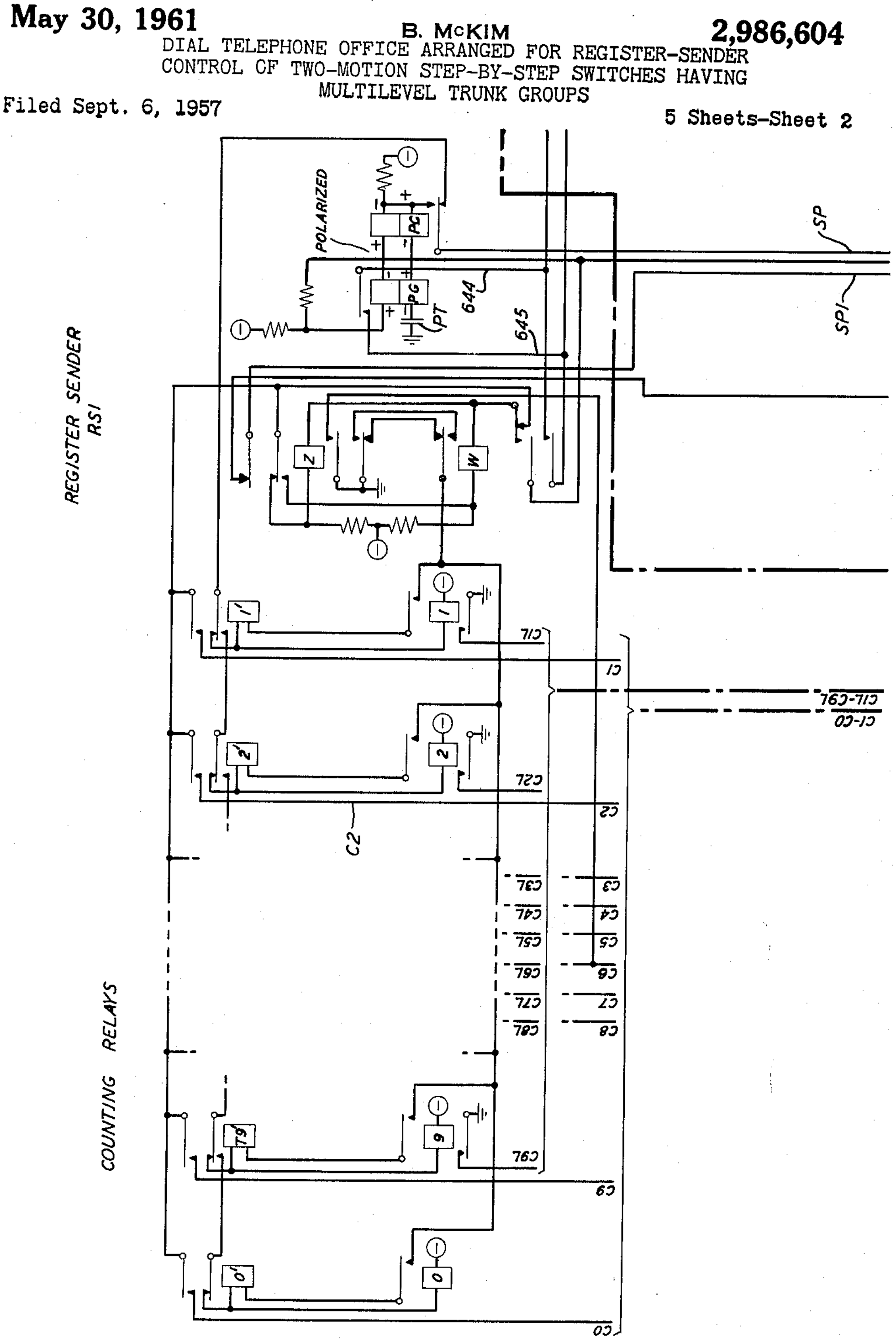
Figs. 2, 3 and 4 show a register-sender RS1, and a translator connector and a translator, all in sufficient detail to operatively cooperate with the equipment shown in Fig. 1.
Figure 3:
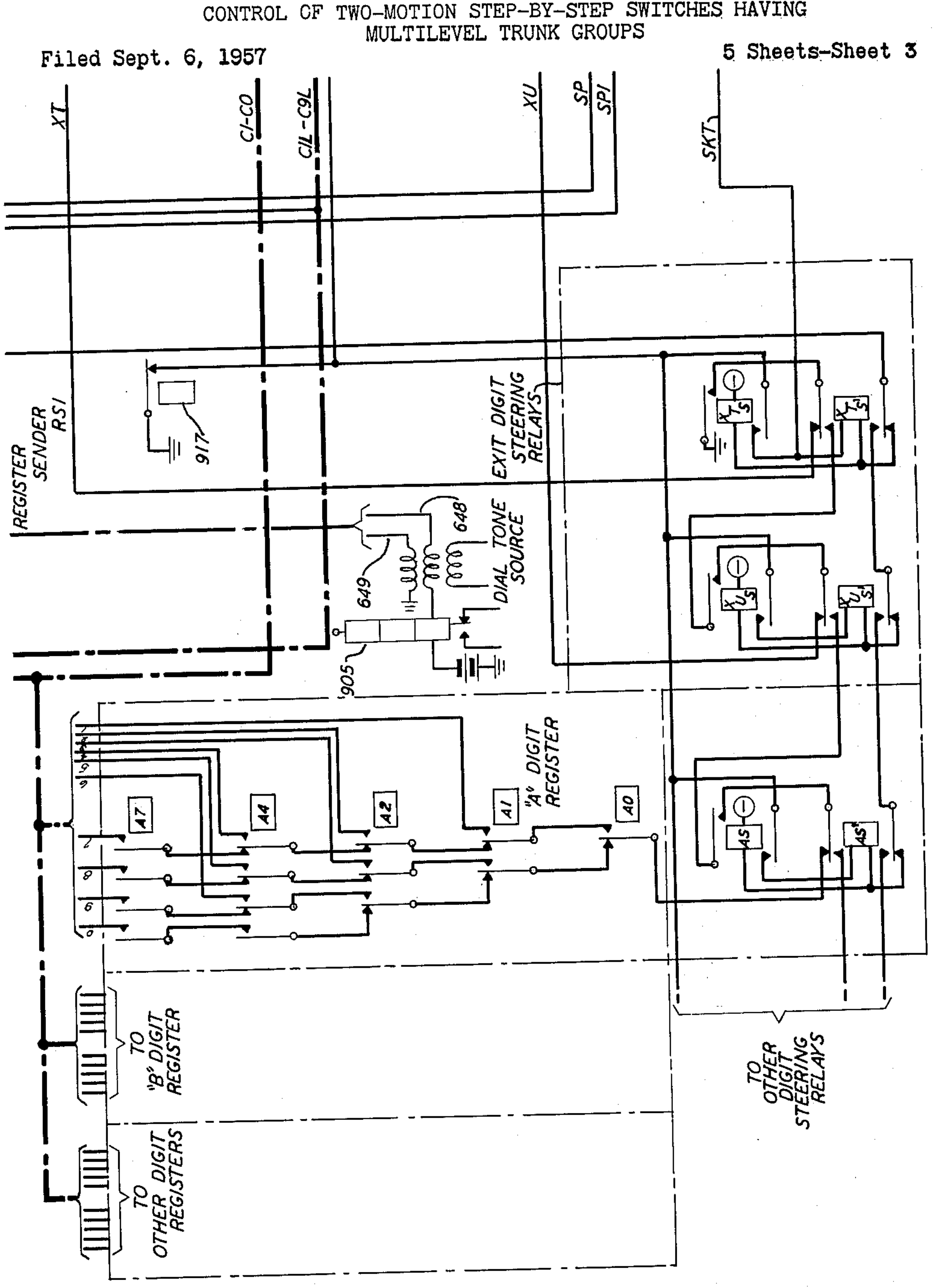
Figure 4:
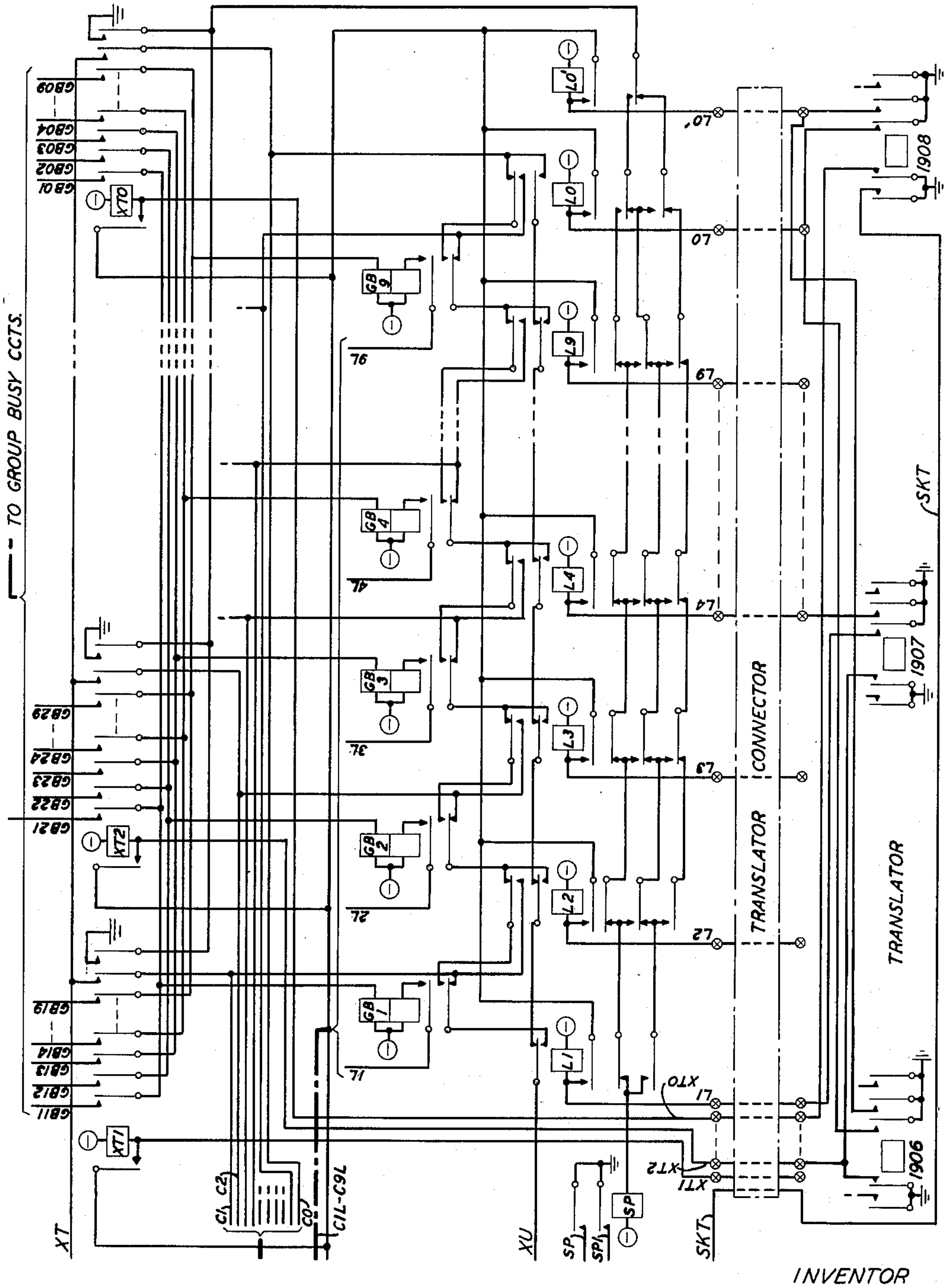

The trunk-finder shown in Fig. 1 operates to connect the finder-selector trunk circuit T1 to common control equipment in Figs. 2, 3 and 4 comprising means for registering the called number responsive to dial pulses from the calling station to which the trunk circuit T1 is connected. This control equipment includes translator means and pulse-sending means for operating the selectors to effect selection of an idle trunk in the group through which the desired connection may be extended. The trunk finder is similar to that shown in Fig. 6 of the aforementioned Dehn patent; and the reference characters used in identifying elements of the finder-selector trunk circuit T1 and the trunk finder are the same as the reference characters used to identify the same elements in the Dehn patent. The digit registers of the control equipment are represented in Fig. 3 by register relays A0, A1, A2, A4 and A7 of the A register, as many registers being provided as are necessary to register the maximum number of digits which a subscriber may dial, for instance 10 digits for calling another subscriber in a distant area. These registers, which are of the two-out-of-five relay type, are shown completely in Patent 2,542,800 granted to J. W. Dehn et al., February 20, 1951, and are set under control of the dial pulse receiving relay 905 shown in Fig. 3, this relay being similar to the like identified dial pulse receiving relay shown in Fig. 9 and described in the aforementioned specification of J. W. Dehn Patent 2,355,908, to which reference may be had for a description of the setting of the registers. Associated with the A register relays are steering relays AS and AS1, similar relays being associated with each register to control the sequence of the sending of digit pulses over any selected outgoing trunk to effect completion of a desired connection. The selection of an outgoing trunk is effected by sending digit pulses to operate first and second selectors, these digits herein being referred to as "exit digits" and control of the sending of these digits being effected by the exit digit steering relays XTS, $XTS^1$ for the tens digit which operates the first selector and relays XUS and $XUS^1$ for the units digit which operates the second selector.

The registration of the area code, if any, and registration of the office code digits responsive to the dialing operations of the calling subscriber station are, in the manner described in the aforementioned Dehn Patent 2,355,908, effective to operate a route relay in a translator. A translator connector and translator are shown in Fig. 4 of the drawing, the translator being represented by three route relays 1906, 1907 and 1908, these being similar to the like designated relays shown in Fig. 19 of the Dehn Patent 2,355,908. As in this Dehn patent, the operation of a route relay identifies the outgoing trunk group in which selection of a trunk effects extension of the connection from the calling station toward the called station. In this Dehn patent, each selector level gives access to a different trunk; whereas in the system herein being disclosed and claimed, one or more groups of trunks is a multilevel group and the sending of trains of pulses to operate the first and second selectors comprises exit tens digit control relays XT1 to XT0, level selecting relays L1 to L0 and $L0^1$, group busy relays GB1 to GB9, the start pulsing relay SP, and the aforementioned exit steering relays XTS, $XTS^1$, XUS, and $XUS^1$. The operation of a route relay effects the operation of the one of the exit tens relays XT1 to XT0 which corresponds to the level of the first selector bank which gives access to the required trunk group. The route relay also effects the operation of the one of the level relays L1 to L0 and $L0^1$ which identifies the first level of the first or second selector bank which gives access to the required group and the operation of one of these relays which identifies the level following the highest level which gives access to the required group. Since the operation of two of the level relays is necessary to define the number of levels to which the required group is connected, it is necessary to provide the $L0^1$ relay in addition to the ten level relays L1 to L0. With one of the exit ten relays XT1 to XT0 operated, and with two of the level relays L1 to $L0^1$ operated, the pulse start relay SP is operated to start pulsing. The operation of an exit tens relay connects the group busy relays GB1 to GB9 of the register sender to contacts of the group busy relays, such as relay G21 which is shown in Fig. 1. The operation of the group busy relays GB1 to GB9 which are associated with selector levels in which all trunks are busy, effects trunk hunting by a selector in the first level giving access to the required trunk group in which there is an idle trunk. Since trunk hunting will be required in the last (the tenth) level of a selector bank irrespective of whether an idle trunk is available, only nine group busy relays are required in the register sender.

With a route relay operated according to the digits dialed and registered, the operation of the start pulsing relay SP, as hereinafter described, causes the sending of the exit tens digit and the exit units digit to operate the first selector and a second selector to select an idle outgoing trunk in the required group. If the required group of trunks is connected to the first selector bank terminals, the exit tens digit is skipped and the first selector is operated by the sending of the exit units digit to select the level group having access to the required trunk group. The sending of the tens and units digits is effected by pulsing control relays PG and PC, the pulses being counted by a set of 10 pairs of counting relays, 1 and $1^1$ to 0 and $0^1$, and by relays W and Z, all of which are shown in Fig. 2. These relays correspond generally to pulse generator relays 1500, 1514 and 1518, and to pulse counting relays 1615, 1616 and 1617 and 1800 to 1805 of the arrangement disclosed in the aforementioned Dehn Patent 2,355,908.

Let us assume that a call is initiated at station A in Fig. 1, that the line finder LF1 and trunk finder TF1 are operated to connect the line L1 to the operating winding of the dial pulse relay 905 of register sender RS1, all in similar manner to that described in the aforementioned Dehn Patent 2,355,908. When the subscriber at station A dials the digits identifying the area code, if the call is to a distant area, and the digits of the directory number of the called station, relay 905 is alternately released and reoperated responsive to each pulse to effect the setting of the various registers, the first train of dial pulses effecting the selective operation of the digit A register relays A0, A1, A2, A4 and A7, the second train of pulses effecting the selective operation of the digit B register relays (not shown), and each succeeding train of pulses effecting the selective setting of an additional register. As soon as the code digits have been registered, a translator route relay is operated to identify the outgoing trunk group in which selection of a trunk is required in the manner described in the aforementioned Dehn Patent 2,355,908. Assume first that route relay 1907 is the one thus operated and that the identified group of trunks is the multilevel group connected to levels 1, 2 and 3 of second selector S2–1 and to the same levels of other second selectors which are connected to level 2 of first selectors, such as S1–1. In this case it is necessary to operate first selector S1–1 to select a trunk in level 2 and to this end the operation of route relay 1907 closes an obvious circuit for operating "exit tens" relay XT2. Relay XT2 locks under control of the register sender off-normal relay 917 which is operated as described in the Dehn patent while the register sender RS1 is being used on the call being described. The operation of relay XT2 connects the upper windings of group busy relays GB1 to GB9 inclusive, to the group busy conductors GB21 to GB29 so as to operate each of these relays in case all of the trunks connected to the corresponding level of the second selectors are busy. The operation of route relay 1907 also closes a circuit for operating level relay L1 since level 1 of the second selectors, connected to level 2 of the first selector S1–1, is the first level giving access to the required multilevel outgoing trunk group. The operation of route relay 1907 also closes a circuit for operating relay L4, since the required trunk group is connected only to levels 1, 2 and 3 of the second selectors. Each of relays L1 and L4 locks operated to off-normal ground at the contact of relay 917.

When one of the "exit tens" relays and two of the level relays have been operated, a circuit is closed for operating the start pulsing relay SP. On the call being described, this circuit includes the winding of relay SP, front contacts of relay L1 and L4 and back contacts of the other level relays and ground at a front contact of relay XT2.

The operation of relay SP connects ground to conductors SP and SP1 to start the transmission of a train of two pulses to operate the first selector S1–1 to select a trunk in level 2. These pulses are transmitted by the contacts of relay PG over conductors 644 and 645 through the trunk finder TF1 and trunk circuit T1 to the line relay (not shown) of first selector S1–1. At the time the register sender off-normal relay 917 of the register sender RS1 is operated, relays PG and PC are operated by energization of their upper windings in series; and relay PG closes a circuit for operating the line relay of the first selector S1–1. When relay SP operates, the connection of ground to conductor SP short circuits the upper windings of relays PG and PC and effects discharge of the pulse timing condenser PT through the lower windings to hold these relays operated until the discharge circuit decays to a level insufficient to maintain operation; and the connection of ground to conductor SP1 closes a circuit for operating steering relay XTS. The release of relay PG opens the pulsing circuit to the line relay of selector S1–1 and the release of relay PC reverses the current through the upper windings and starts the charging of condenser PT in series with the lower windings. At the end of a desired interval of time the charging current decays to a level which permits operative energization by the current through the upper windings; and the reoperation of relay PG recloses the circuit for operating the line relay of the selector S1–1. This cycle of operation of relays PG and PC is repeated to send the number of pulses required as indicated by the exit tens relay which is operated. The first release of relay PC closes a circuit for operating counting relay 1 and the succeeding reoperation of relay PC causes the operation of relay 1$^{1}$ in series with relay 1; and these relays lock through back contacts of relays W and Z. The second release of relay PC closes a circuit for operating counting relay 2 and the succeeding operation of relay PC causes operation of relay 2$^{1}$. On the call being described and with exit tens relay XT2 operated, the operation of relay 2$^{1}$ closes a circuit for operating relay W, this circuit being traced from battery, through the winding and continuity back contact of relay W, a front contact of relay 2$^{1}$, conductor C2, a front contact of relay XT2, conductor XT, a back contact of relay XTS$^{1}$ and a front contact of relay XTS to ground. Contacts of relay W close the outgoing pulsing circuit in parallel with the pulsing contacts of relay PG so that no more pulses are transmitted to the line relay of selector S1–1. Thus the brushes of selector S1–1 are stepped to the second level and an idle set of terminals selected in usual manner, which terminals connect to a second selector, such as S2–1. The aforementioned operation of relay W opens the locking paths of the operated counting relays causing their release. The release of relay 2$^{1}$ causes the operation of relay Z in series with relay W. The operation of relay Z disconnects the grounded conductor SP1 from the windings of relays XTS and XTS$^{1}$, thus causing the operation of relay XTS$^{1}$ in series with relay XTS. The operation of relay Z also restores the counting relay locking ground and connects ground to conductor C6. The continued cyclic operation of the PG and PC relays effects the counting of an interdigital interval in the manner described in the Dehn Patent 2,355,908 to allow time for the selector S1–1 to hunt for and connect with an idle set of terminals in the selected level. When counting relay 6$^{1}$ (not shown) operates at the end of the sixth pulse, the ground connected to conductor C6 causes the release of relay W, whereby the counting relay locking ground connection is again opened to again release the counting relays. The release of counting relay 6$^{1}$ causes the release of relay Z, thus again restoring the counting relay locking ground preparatory to the sending of the units exit digit under control of the operated level relays L1 and L4. The release of relay Z, after relay XTS$^{1}$ has operated, causes the operation of the exit units digit steering relay XUS; and the operation of relay XUS connects ground to conductor XU.

Upon selection of the terminals, in level 2 of selector S1–1, which connect to second selector S2–1, the pulsing circuit from the contacts of relay PG is disconnected from the line relay of the first selector and extended to the line relay (not shown) of this second selector. The units digit 1 is now transmitted, providing there is at this time an idle trunk in the first level of the second selector S2–1, as indicated by relay GB1 not being operated; in which case conductor XU is connected through a front contact of relay L1 and a back contact of relay GB1 to conductor C1. Since relay W is not operated, the next release of relay PG opens the pulsing circuit, causing the brushes of selector S2–1 to be stepped up to the first level; the release of relay PC causes the operation of counting relay 1; and at the end of the pulse, the reoperation of relay PC causes the operation of relay 1$^{1}$. The ground connected to conductor XU thereupon effects the operation of relay W followed by the release of the counting relays, the operation of relay Z, the counting of an interdigital interval, the operation of steering relay XUS, the release of relay W and the release of relay Z in the manner above described. During the interdigital interval, the second selector S2–1 operates to select the first idle set of the terminals connected to trunks T211 to T210. Assuming the first set of terminals tests idle, the trunk T211 is selected and the pulsing circuit is extended through the brushes of selector S2–1 to impulse repeating means (not shown) in the trunk circuit. The release of the Z relay extends the ground conductor SP1, through front contacts of steering relays XTS¹ and XUS¹ to operate steering relay AS. With relay AS operated, ground is connected from the upper front contact of relay XTS, through front contacts of relays XTS¹, XUS, XUS¹ and AS to control the operation of the counting relays during the sending of a train of pulses, corresponding to the setting of the A register, from the pulsing contacts of relay PG to the outgoing trunk circuit to control the operation of switching means at the remote end of the trunk T211. In turn, each of the registers becomes effective in similar manner to control the transmission of digits corresponding to the settings of the registers, thereby to effect completion of the desired connection.

If, at the time that relay Z releases, following the sending of the exit tens digit 2, the group busy relay GB1 is operated due to all of the trunks in the first level of selector S2–1 being busy, and relay GB2 is not operated due to there being one or more idle trunks in level 2, conductor XU is connected through front contacts of relays L1 and GB1, a back contact of relay GB2 to conductor C2; so that two pulses will be transmitted to the line relay of selector S2–1 to step the brushes to level 2. The operation of counting relay 1 connects ground to conductor C1L to hold relay GB1 operated so that selection will be made in level 2 by selector S2–1 even though the all-trunk-busy condition in level 1 is ended during the transmission of the exit units digit 2. After selection of level 2, the selector S2–1 hunts for an idle trunk in that level, and after the counting relays have measured an interdigital interval, pulses are transmitted to the selected trunk circuit corresponding to the digits registered on the A, B and succeeding registers to effect completion of the desired connection.

If, at the time relay Z releases following the sending of the exit tens digit, both of relays GB1 and GB2 are operated due to all trunks in both of levels 1 and 2 being busy, the XU conductor is connected through front contacts of relays L1 and GB1, a back contact of relay L2, a front contact of relay GB2, and a back contact of relay GB3 to conductor C3; so that three pulses are transmitted to the line relay of selector S2–1 to effect selection of level 3 and an idle trunk therein. If all of the trunks in level 3 are also busy, relay GB3 is also operated and the connection of the XU conductor to conductor C3 further includes a front contact of relay GB3 and a front contact of relay L4 and effects selection of level 3 although there is no idle trunk therein. In this case the selector returns a busy tone to the calling station after the register sender is disconnected in usual and well known manner. The group busy relays GB1, etc. can operate during pulsing of the units digit so that a higher level can be selected very late or at the last moment.

After all of the registered digits have been transmitted to and over the selected outgoing trunk, relay 202 in the finder-selector trunk circuit T1 is released, and the trunk finder TF1 and register sender RS1 are restored to normal in the manner set forth in the aforementioned Dehn Patent 2,355,908.

Assume next that the translator route relay which is operated indicates that the trunk group is a single level group connected to the tenth level of the group of second selectors which are connected to the second level of first selectors, such as S1–1. This route relay is shown as relay 1906 in the translator in Fig. 4. With relay 1906 operated, ground is connected to operate exit tens relay XT2 and to operate level relays L0 and L0¹. The start pulsing relay SP is thereupon operated, followed by the operation of steering relay XTS. Pulses are transmitted by relay PG and the counting relays are operated in sequence. When relay 0¹ operates, relay W is operated in a circuit including conductor XU and a front contact of relay XT0. The operation of relay W releases the counting relays, relay Z is operated, relay XTS¹ is operated, the interdigital interval is counted, relay W is released, the counting relays are released, relay Z is released and steering relay XUS is operated in the manner above described. The two exit tens digit pulses, transmitted to the line relay of the first selector S1–1 step the brushes to level 2 and effect selection of an idle second selector, such as selector S2–1. The operation of relay XUS extends the connection from ground at the upper front contact of relay XTS to conductor XU through back contacts of the level relays L1 to L9 and a front contact of relay L0 to conductor C0 to again effect the operation of relay W after ten exit unit digit pulses have been sent by the contacts of relay PG to the line relay of the second selector S2–1. The selector S2–1 is thus stepped to the 0 level and selection of an idle trunk, such as T201, is effected. Thereafter the digits dialed and registered on the A, B and succeeding registers are transmitted to the selected trunk and thereover to control completion of the desired connection.

In case one or more levels of the first selector are connected to outgoing trunks, only one exit digit is needed to effect trunk selection. One such trunk group is shown connected to level 0 of first selector S1–1. Assuming the dialing and registration of a call completed through this group, which is represented by outgoing trunk circuit T–01, the translator route relay 1908 is operated to effect the operation of exit tens relay XT0 and level relays L0 and L0¹. The operation of route relay 1908 also connects ground to the skip tens conductor SKT to effect the operation of steering relays XTS and XTS¹ so as to skip the sending of the exit tens digit. When the start pulsing relay SP operates, it closes a circuit including a front contact of relay XTS¹ and a back contact of relays XUS¹ for operating exit units steering relay XUS. The operation of relay XUS connects ground from the upper contact of relay XTS, through front contacts of relays XTS¹ and XUS, conductor XU, back contacts of relays L1 to L9 inclusive and a front contact of relay L0, to conductor L0. Ten pulses are transmitted by relay PG to the line relay of the first selector SL–1, to step the brushes up to the 0 level and effect the selection of an idle outgoing trunk circuit such as T–01.

Figure 6:
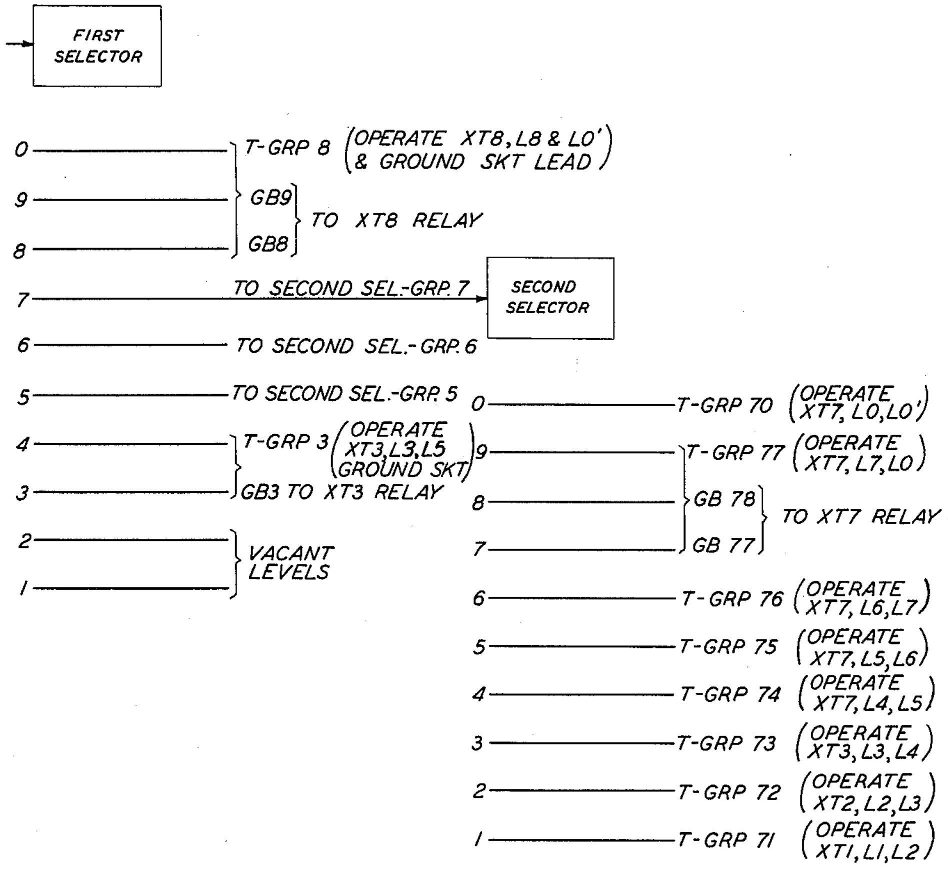
Fig. 6 shows a typical trunking arrangement for a telephone system involving multilevel trunk groups in both of two selector stages, trunk selection being effected by common control equipment similar to that provided in Figs. 1, 2, 3 and 4.

The trunking arrangement shown in Fig. 6 is one in which multilevel trunk groups are connected to both first and second selector banks. As shown, levels 1 and 2 of the first selectors are vacant levels, levels 3 and 4 are connected to a group of twenty outgoing trunks, levels 5, 6 and 7 each give access to corresponding groups of second selectors, and levels 8, 9 and 0 connect to a group of thirty outgoing trunks. To select a trunk in the group accessible through levels 3 and 4, the associated route relay operates relays XT3, L3 and L5 and connects ground to conductor SKT; and the group busy conductor from level 3 is connected through a contact on relay XT3 to the GB3 relay winding. To select a trunk in the group accessible through levels 8, 9 and 0, the associated route relay operates relays XT8, L8 and L0¹ and connects ground to conductor SKT. The second selector, which is shown connected to a set of terminals in level 7 of the first selectors, gives access through levels 1 to 6 inclusive and level 0 to seven outgoing trunk groups of ten trunks each, and also gives access through levels 7, 8 and 9 to a trunk group of thirty trunks. The relays exit tens and level relays which are operated by the associated route relays are shown for each group; and for the multilevel group it is indicated that the group busy conductor from each of levels 7 and 8 is connected through contacts of relays XT7 to the GB7 and GB8 relays, respectively.

What is claimed is:

1. In a telephone office comprising subscriber lines and dial stations, means for establishing connections between calling and called lines, said means including two-motion step-by-step selector switches, groups of trunks connected to the terminal banks of said switches, the trunks of one or more of said groups being connected to the terminals of a plurality of consecutively numbered levels, means for each selector level of each of said groups for indicating when all of the trunks in the level are busy, control means comprising registers for registering the directory number of a called station responsive to pulses from a calling station, means for connecting said control means to a calling one of said lines and to one of said switches, means controlled by said registers to determine the particular one of said groups of trunks in which selection of a trunk is required, and means for transmitting pulses to said one switch to effect selection of the lowest numbered level of terminals which are connected to trunks in the determined group and in which there is an idle trunk.

2. In a telephone office comprising subscriber lines and dial stations, means for establishing connections between calling and called lines, said means including two-motion step-by-step selector switches, groups of trunks connected to the terminal banks of said switches, the trunks of one or more of said groups being connected to the terminals of a plurality of consecutively numbered levels, means for each selector level of each of said groups for indicating when all of the trunks in the level are busy, control means comprising registers for registering the directory number of a called station responsive to pulses from a calling station, means for connecting said control means to a calling one of said lines and to one of said switches, means comprising route relays controlled by said registers to determine the particular one of said groups of trunks in which selection of a trunk is required, and means comprising outgoing digit code relays controlling the transmission of digit pulses to effect the operation of said selector switches to select the lowest numbered level in which the terminals are connected to trunks in the determined group and in which there is an idle trunk.

3. In a multioffice telephone system, an office comprising subscriber lines and dial stations and groups of trunks outgoing to other offices, switching means for establishing connections between calling and called lines and between calling lines and outgoing trunks, said switching means including two-motion step-by-step first stage selector switches and second stage selector switches, one or more of said groups of trunks being a multilevel group the trunks of which are connected to consecutively numbered banks of second selectors, means for each selector level of each of said groups for indicating when all of the trunks in the level are busy, control means comprising registers for registering the directory number of a called station responsive to pulses from a calling station, means for connecting said control means to a calling one of said lines and to one of said switches, means controlled by said registers to determine the particular level of a first stage selector by way of which access to said multilevel group of trunks in a second stage selector is had, and means for transmitting impulses to said first and second stage selectors to automatically advance said first stage selector to the said particular level and to automatically advance said second stage selector to the lowest numbered bank level of those to which the multilevel group of trunks is connected and in which there is an idle trunk.

4. The multioffice telephone system according to claim 3 in which some of the groups of trunks outgoing to other offices are connected to first selectors and other of the groups are connected to second selectors.

5. In a telephone system, an office comprising subscriber lines and dial stations, means for establishing connections between calling and called lines, said means including two-motion step-by-step switches, groups of trunks connected to the terminals of said switches, the trunks of at least one of said groups being connected to the terminals of a plurality of consecutively numbered switch levels, means individual to each switch level for indicating when all of the trunks therein are busy, control means comprising registers for registering the directory number of a called station responsive to pulses from a calling station, means for connecting said control means to a calling one of said subscriber lines and to one of said switches, means controlled by said registers to determine the particular one of said groups of trunks in which selection of a trunk is required and for identifying the switch levels allocated to the said particular one of said groups of trunks, and means for transmitting pulses to said one switch to effect the selection of the determined particular trunk group and the connection of said one switch to the lowest numbered switch level, of those allocated to the said particular one of said trunk groups, having an idle trunk therein.

6. A telephone system in accordance with claim 5 and which includes means responsive to the connection of said one switch to an idle trunk in the determined trunk group for enabling said control means to transmit, over the idle trunk, pulses corresponding to the called station directory number registered therein.

7. In a telephone system, an office comprising subscriber lines and dial stations, means for establishing connections between calling and called lines, said means including a first two-motion step-by-step switch and a second two-motion step-by-step switch, groups of trunks connected to the terminals of said second switch, the trunks of at least one of said groups being connected to the terminals of a plurality of adjacent switch levels, means individual to each level of said second switch for indicating when all of the trunks therein are busy, control means comprising registers for registering the directory number of a called station responsive to pulses from a calling station, means for connecting said control means to a calling one of said subscriber lines and to said first switch, means controlled by said registers to determine the particular one of said groups of trunks in which selection of a trunk is required and for identifying the number of switch levels allocated to the said particular one of said groups of trunks and the particular level of said first switch by way of the terminals of which said particular group of trunks is accessible, and means for transmitting pulses to direct said first switch to the particular level thereof by way of which the said identified trunk group is accessible, and for automatically stepping said second switch to the lowest numbered one of those levels, allocated to the said identified trunk group, having an idle trunk appearance therein.

8. A telephone system in accordance with claim 7 and which includes means responsive to the connection by said second switch to an idle trunk in the said identified trunk group for enabling said control means to transmit, over the idle trunk, pulses corresponding to the called station directory number registered therein.

9. In a multioffice telephone system, an office comprising subscriber lines and dial stations and groups of trunks outgoing to other offices, switching means for establishing connections between calling and called lines and between calling lines and outgoing trunks, said switching means including nonlevel-hunting, two-motion step-by-step first stage and second stage selector switches, at least one of said groups of trunks being a multilevel group, the trunks of which are connected to a plurality of consecutively numbered terminal bank levels of a second stage selector and are accessible by way of a particular level of said first stage selector, means for each second stage selector level of the multilevel group for indicating when all of the trunks in the level are busy, control means comprising registers for registering the directory number of a called station responsive to pulses transmitted from a calling station, means for connecting said control means to a calling line and to one of said switches, a level-indicating relay for each level of said second stage selector switch, means controlled by said registers in response to the dialing of the area code of a called station directory number for automatically advancing said first stage selector to the level thereof by way of which said multilevel trunk group is accessible and for operating a pair of said level indicating relays, said pair including a relay corresponding to the lowest numbered level of which the said multilevel group is comprised and a relay corresponding to a level exceeding by one the number of the highest level of which said multilevel group is comprised, means controlled by the particular level relays operated for enabling said registers to initiate the transmission of a pulse train including at least a number of pulses required to advance the said second stage selector to the lowest numbered level of those levels comprising the said multilevel group and for increasing the number of pulses in the pulse train by one for each busy level of the said multilevel group, whereby said second stage selector is automatically advanced to the lowest level of the said multilevel group in which there is an idle trunk to select an idle trunk therein, and means responsive to the selection of the said idle trunk for enabling said control means to transmit, over the selected trunk, pulses corresponding to the called station digit pulses registered therein.

References Cited in the file of this patent

UNITED STATES PATENTS

| | | |
|---|---|---|
| 1,723,209 | Ruggles | Aug. 6, 1929 |
| 1,886,613 | Wicks | Nov. 8, 1932 |
| 2,249,067 | Wadsworth | July 15, 1941 |
| 2,291,481 | McDavitt | July 28, 1942 |
| 2,327,466 | Scott | Aug. 24, 1943 |
| 2,355,908 | Dehn | Aug. 15, 1944 |
| 2,660,619 | Kessler | Nov. 24, 1953 |